P. J. SCHEUERMANN.
PROCESS OF TREATING FRUITS.
APPLICATION FILED MAY 24, 1909. RENEWED JULY 16, 1914.
1,108,521.
Patented Aug. 25, 1914.
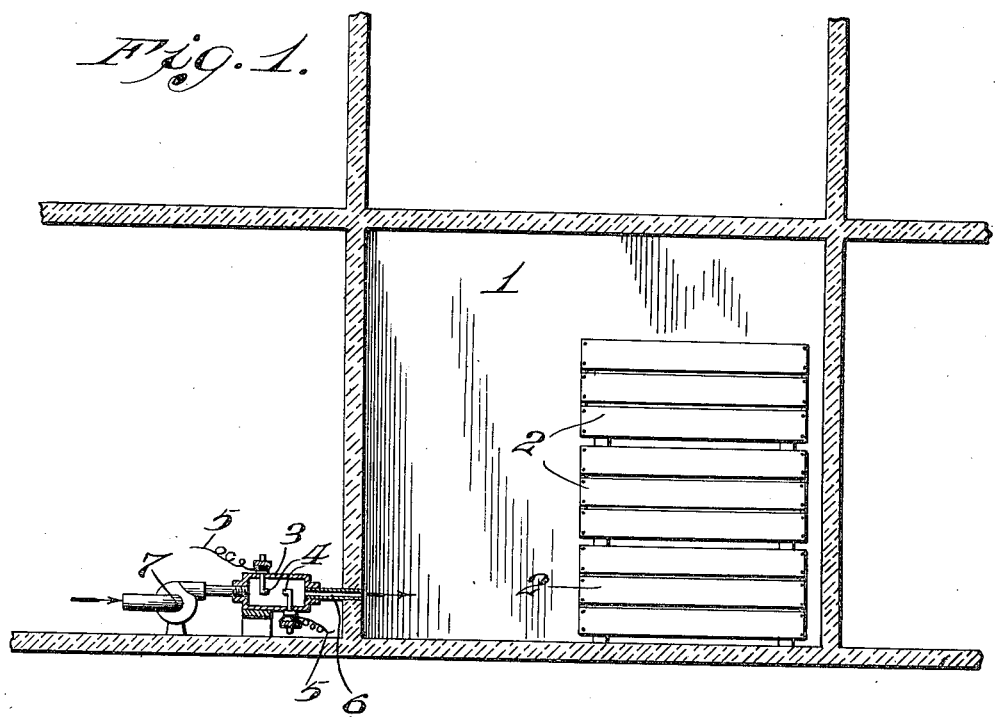
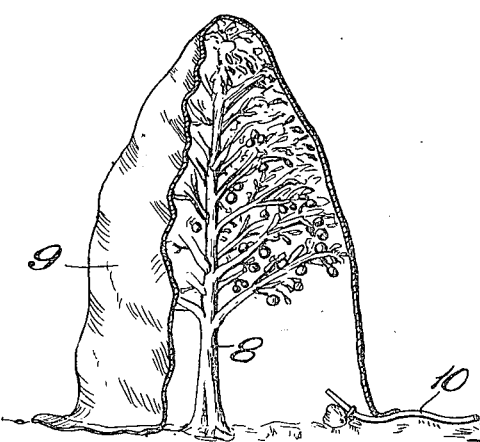

UNITED STATES PATENT OFFICE.

PHILIP J. SCHEUERMANN, OF ST. LOUIS, MISSOURI, ASSIGNOR OF ONE-THIRD TO STEPHEN G. MARTIN, OF CHICAGO, ILLINOIS, ONE-THIRD TO WILLIAM O. BARTHOLOMEW, OF ST. LOUIS, MISSOURI, AND ONE-THIRD TO EDWARD SCHAAF, OF ST. MARYS, MISSOURI.

PROCESS OF TREATING FRUITS.

1,108,521.      Specification of Letters Patent.      Patented Aug. 25, 1914.

Application filed May 24, 1909, Serial No. 497,885. Renewed July 16, 1914. Serial No. 851,402.

*To all whom it may concern:*

Be it known that I, PHILIP J. SCHEUERMANN, a citizen of the United States, and resident of St. Louis, Missouri, have invented certain new and useful Improvements in Processes of Treating Fruits, of which the following is a specification containing a full, clear, and exact description, reference being had to the accompanying drawings, forming a part hereof.

My invention relates to a process of treating fruits, the principal object of such treatment being for the purpose of destroying the larvæ and pollen, spore and fungi growths and all insect enemies injurious to the fruit or fruit's growth, thereby preventing the depredations of the insects and rendering the fruit sterile, whereby the decay and fermentative putrefaction incident to the presence of spores and fungi is prevented.

It is well known that the depredations of insects and other enemies constitute an important obstacle to the profitable cultivation and growth of all fruits, and one of the objects of my invention, as above stated, is to destroy all insect life, their eggs, larvæ and pollen, spore, fungi and other mold growths of the fruits during their growth, thereby rendering the fruit sterile, whereby the decay and fermentative putrefaction incident to the presence of the spores and fungi is prevented.

Under the present methods of handling fruit, it is necessary to harvest it before it has fully ripened in order to prevent its decay while in transit or storage, and its further ripening or mellowing conditions is dependent entirely upon conditions of temperature, etc., incident to its shipment or storage. In addition to the deterioration of the fruit in its flavor, there is always the possibility of well known digestive disturbances when fruit is eaten raw or in a green state, and the same conditions apply to over-ripe fruit, due possibly to the fact that the latter is in a partial state of fermentation. Both of these are conditions due to the present method of fruit marketing, and are objectionable. Decayed or partially decayed stale or pitted fruits have a decided characteristic odor and flavor, caused by fungi, especially from molds and rots, which penetrates the pulp and grows and develops rapidly when brought into contact with fruit juices. The nearer the fruit has approached the fully ripened condition, the more susceptible it is to the action of this fungi and mold growth, this being due in part to the softening, mellowing or luscious condition of the fruit incident to its ripening, and also to the fact that the molds and fungi develop in approximately the same ratio in strength and number as the fruit ripens, and the fruit juices of ripe fruits being ideal media for the development of the harmful ferments. The slighest bruise or cut given the fruit at this stage offers the ideal condition for their attack upon the fruit and putrefaction or rot immediately follows.

My process has its particular value when applied to fruits by its action upon the fungi, molds, spores, etc., in that it destroys them or makes them inactive, thereby making the fruit sterile so that decay and putrefaction is impossible from that source. I claim that my process does not make a chemical or other change in the fruit itself, but that its action is selective in its nature in attacking only those growths which are detrimental to the health and growth of the fruits, but in my process all enemies and ferments of the fruit are destroyed, thereby making it possible to allow the fruit to ripen on the tree and to ship it with the same safety as that of the green fruit shipments according to the usual custom.

In the process or method to which this application refers, the essential agent which I employ in treating the fruits is a gaseous medium containing peroxid of nitrogen, which gaseous medium may be produced chemically or electrically.

In this application I have shown my method or process used in treating fruits at a packing house and also in treating it on a fruit tree, and to illustrate this application of the process Figure 1 indicates a sectional view of a packing house; and Fig. 2 represents a fruit tree having fruit thereon with a covering or canopy applied over the same.

Referring to the drawings, 1 indicates a compartment of the packing house and 2 indicates a series of fruit boxes with fruits therein. In the illustration I have shown electric means for producing the gaseous medium containing peroxid of nitrogen, which means consists of a housing 3, and located in said housing are a pair of electrodes 4, and connected to said electrodes are service wires 5. Leading from the housing 3 in the compartment 1 is a pipe 6, and 7 indicates a fan for forcing atmospheric air into said housing. The apparatus illustrated, as stated, is one form of electric means for producing an electric flaming discharge, and when the atmospheric air is forced through said electric flaming discharge a gaseous medium containing peroxid of nitrogen is produced, and this gaseous medium is the agent which I employ in carrying out my process. When this gaseous medium is produced, it is brought into intimate contact with the fruit. If it is applied to fruit, the fruit should be located in an inclosure, so as to confine this gaseous medium, or if it is applied to a tree with the fruit on it, the tree should be inclosed by a canopy or other cover, so that this gaseous medium may be partially or momentarily confined around the tree bearing the fruit.

In Fig. 2, 8 is an illustration of the fruit tree and 9 a covering or canopy for the same, which may be held down to the ground in any suitable manner. 10 indicates a hose or pipe which is adapted to be connected to a source of supply of a gaseous medium containing peroxid of nitrogen.

I have employed my process in treating oranges, apples, grapes, tomatoes, bananas, peaches, pears, etc., and the results of such treatment have been remarkable, in preventing decay and fermentative putrefaction of the fruits.

According to my process, the fruit may be treated with this gaseous medium after it is packed and while it is on the tree. In the latter, if the fruit is treated while it is on the tree, the tree is also treated, and all insect life and spore, fungi and other mold growths of the trees is destroyed. It is evident that the fruit may be treated at any stage in its growth, or after it is picked; in the packing house, in transit, or in storage.

I claim:

The herein described process of treating fruit, which consists in subjecting the fruit to a gaseous medium consisting of a mixture of an oxid of nitrogen and air, substantially in the proportions of two per centum of an oxid of nitrogen and ninety-eight per centum of air.

In testimony whereof, I have signed my name to this specification, in presence of two subscribing witnesses.

PHILIP J. SCHEUERMANN.

Witnesses:
EDWARD E. LONGAN,
E. L. WALLACE.